COMBINATION REVERSIBLE PULLER

Original Filed Feb. 7, 1962 2 Sheets-Sheet 1

INVENTOR. Mike Brodie
BY - Edward Greeley Bishop
ATTORNEY

COMBINATION REVERSIBLE PULLER

Original Filed Feb. 7, 1962 2 Sheets-Sheet 2

INVENTOR- Mike Brodie
BY- Edward Eversley Bishop
ATTORNEY

United States Patent Office

Re. 26,798
Reissued Feb. 17, 1970

26,798
COMBINATION REVERSIBLE PULLER

Mike Brodie, Box 64, Vilna, Alberta, Canada

Original No. 3,089,229, dated May 14, 1963, Ser. No. 171,704, Feb. 7, 1962. Application for reissue Oct. 4, 1968, Ser. No. 786,787
Int. Cl. B23p *19/04*
U.S. Cl. 29—261 5 Claims

Matter enclosed in heavy brackets [ ] appears in the original patent but forms no part of this reissue specification; matter printed in italics indicates the additions made by reissue.

Generally speaking, this invention relates to devices for removing gears, bearings, sleeves and the like, that have become wedged tightly on a shaft or in a cylinder and, in particular the invention relates to an improved device for this purpose that combines a gear and sleeve puller in one article.

The principal object is to provide a gear puller that may be adjusted in a variety of positions and sizes to pull gears or pulleys of various shapes and sizes.

A further object is to provide a gear puller that may be reversed quickly and easily to provide a sleeve puller which also may be adjusted quickly and easily to accommodate sleeves of different diameters.

A further object is to provide a gear puller that may be used to pull a variety of gears, pulleys, sleeves and the like without the necessity for additions or attachments that must be added to the device.

A further object is to provide an improved combination gear and sleeve puller that may be dismantled quickly and easily and stored in a relatively small container for ease of transportation.

Additional objects and advantages of my device will be obvious from the following specification and the attached drawings which must be considered only as illustrative and diagrammatic and not as a limitation.

Figures 1, 3:
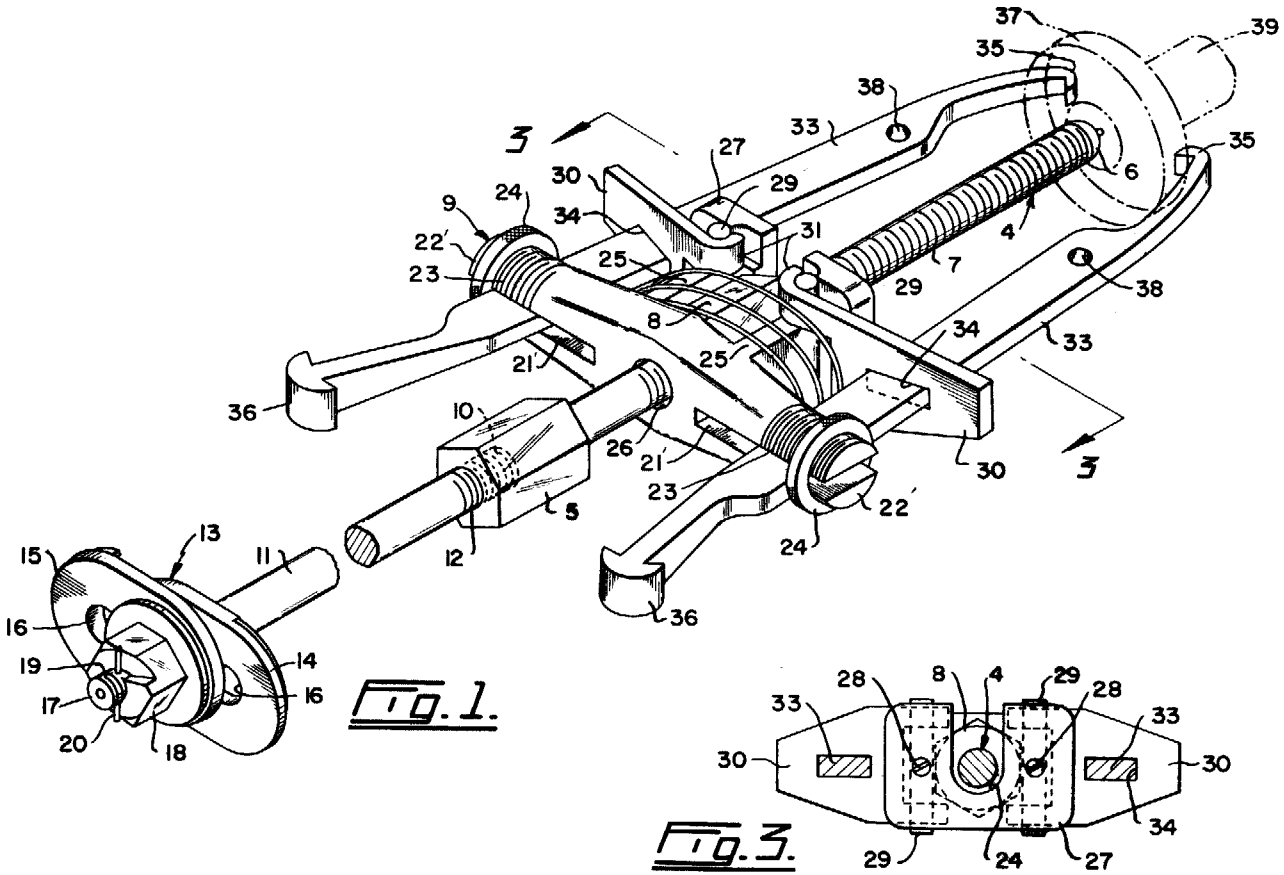
FIGURE 1 is a projected broken away view of my device in use as a gear or pulley puller.
FIGURE 3 is a view taken substantially along the line 3—3 of FIGURE 1.

With reference now to the drawings my device comprises the threaded rod indicated generally at 4 which is provided with a driving head 5 at its one end and with a rounded point 6 at its opposite end. Suitable threads 7 throughout the length of the rod co-act with the nut 8 *non-rotatably* located in the main supporting member 9 so that rotation of the threaded rod by the driving head 5 will move the rod relatively to the support member 9.

The driving head 5 is formed with a threaded socket 10 at its upper end and the extension bolt 11 formed with threads 12 may be secured in the threaded socket 10 at its one end as indicated. At its opposite end 21 the extension rod 11 mounts the sleeve puller indicated generally at 13.

The sleeve puller includes the arms 14 and 15 each formed with a central slotted opening 16 *and* are mounted slidably on the stub shaft 17 and secured thereon by the nut 18 on threads 19. The stub shaft 17 is secured pivotally to the outer end 21 of the auxiliary shaft 11 by the pin 22.

The main support member 9 is formed with slots 21' extending towards the centre from opposite ends 25 of the member. The opposite ends 22 are each threaded exteriorly as indicated at 23 and are provided with an adjusting ring nut 24 engaged threadably on the threads 23. A pair of spaced legs 25 extends downwardly from the cross member 9 on opposite sides of the central opening 26 and a bottom plate 27 formed with a central slot 28 is secured at the bottom of the legs 25—25 by screws 28 or like means. Pins 29—29 extend from opposite edges of the legs 25—25 adjacent the bottom plate 27 and locking arms 30 are each formed with inner curved ends 31 to engage on the pins 29. A compression spring 32 reacts between the cross member 9 and the locking arms 30 to normally maintain the hooked ends 31 of the locking arms on the pins 29.

A pair of elongated puller bars 33 each are formed to fit slidably in one of the slots 21 in the main cross member 9 and to fit slidably through additional squared openings 34 in each of the locking arms 30. Each of the arms 33 is formed with identical hook jaws 35 at one end and heads 36 at the opposite end, the jaws 35 normally are used when pulling a gear 37 and the like, while the heads 36 may be used when the device is used for sleeve pulling. Openings 38 in each of the bars 33 allow the bars 33 to be interconnected through a chain or like means if the device is to be used for hoisting or pressing in sleeves and the like.

In operation and with the apparatus adjusted for pulling a gear 37 from the shaft 39 as illustrated in FIGURE 1, it will be seen that the rounded point 6 is engaged with the centre of the shaft 39 while the hooks 35 on the ends of the bars 33 engage with the gears 37 to be pulled. Thereafter, rotation of the head 5 will move the threaded shaft 4 with relation to the main support member 9 and the bars 33 and the combined upward and downward pressure will pull the gear 37 from the shaft 39.

When used for sleeve pulling the nut 8 is removed from the main support member 9 and is positioned to bear against the bottom plate 27. The jaws 14 and 15 are adjusted to grip under the end of the sleeve 40 and thereafter when the heads 36 bear against the solid surface in which the sleeve 40 is embedded, rotation of the nut 8 will pull the bolt 4 through the main support member and obviously will pull the sleeve 40 as desired.

The heads 36, if desired or necessary, may be used when pulling large gears or pulleys. When used in this manner, the bars 33 are positioned in the cross member 9 and the locking arms 30 in the reverse position to that illustrated in FIGURE 1 in the drawings.

Figure 2:
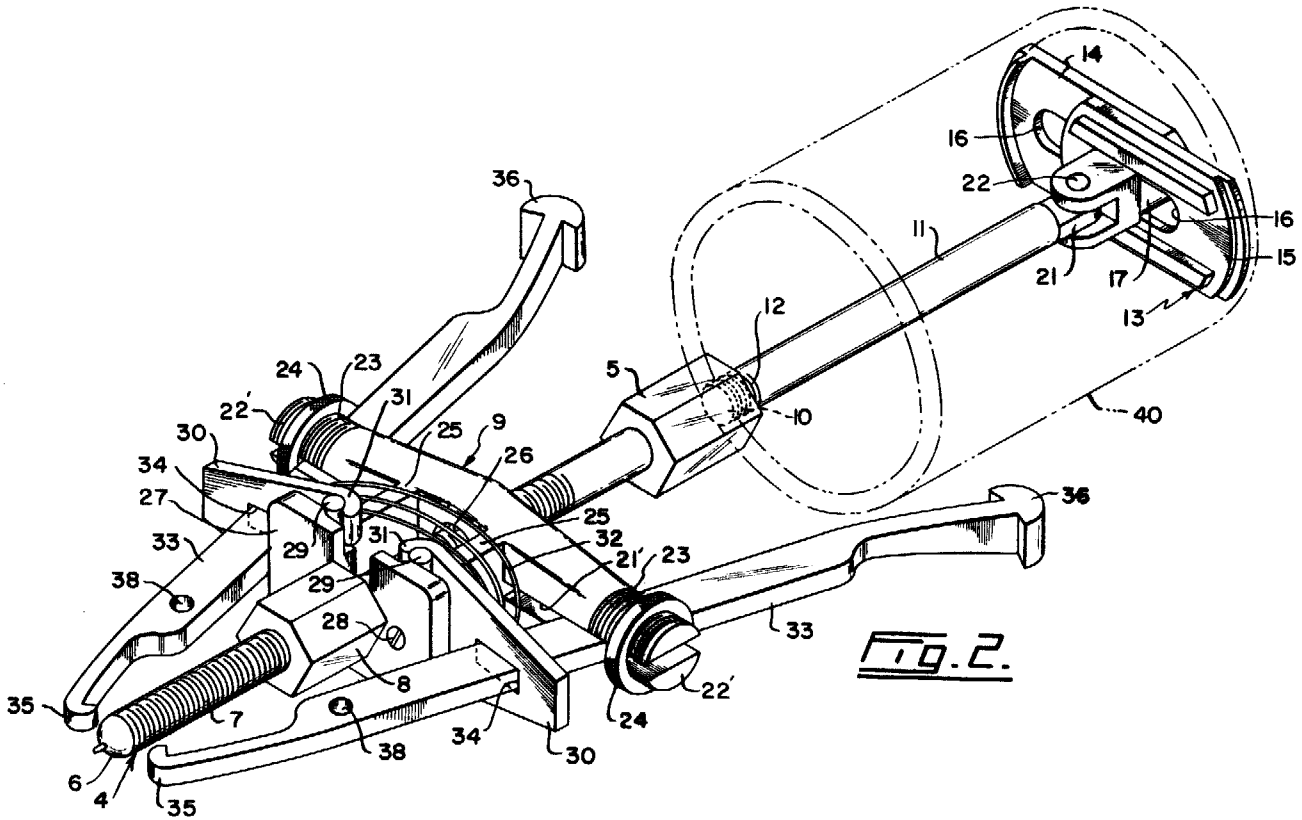
FIGURE 2 is a projected view of my device in use as a sleeve puller.

In either the gear pulling or sleeve pulling operation, it will be seen that the bars 33 may slide easily in a right to left direction when operated, as in FIGURE 1, or in a left to right direction as seen in FIGURE 2. In other words, whenever the locking arms 30 are moved toward the main cross member 9, the bars 33 will slide easily.

However, whenever the bars 33 are moved in the opposite direction, the gripping action of the bars 33 in the slots 34 will move the locking arms 30 and grip the bars 33 to prevent any movement of the bars.

What I claim as my invention is:

1. In a reversible puller, an elongate main support member, a nut mounted [rotatably] *non-rotatably* in the main support member, a rod having a work engaging point at one end and a driving head at the opposite end and engaged threadably with the said nut to project substantially at right angles to the elongated main support member, slots in the elongated support member extending from the ends thereof towards the centre, external urge the locking arms away from t he main support member and locking nuts engaged threadably on such threads, locking arms connected pivotally at one end to the main supporting member to extend on opposite sides of the rod in the same plane as the rod, openings in the said locking arms in alignment with the slots in the main support member, spring means coacting between the main support member and the locking arms normally to urge the locking arms away from the main support member, puller bars mounted slidably through the slots in the elongated supporting member and the openings in the locking arms and work engaging means on the opposite ends of the puller bars.

2. The reversible puller as claimed in claim 1 wherein the elongated main support member tapers from the centre thereof towards its ends.

3. The device as claimed in claim 1 and an extension rod connected threadably at one end to the driving head and having an adjustable sleeve pulling mechanism mounted pivotally at its opposite end.

4. In a reversible puller, a main support member, a nut fitted removably in the main support member and [rotatable] *non-rotatable* therein, a rod having a work engaging point at one end and a driving head at the opposite end and engaged threadably through the said nut to project on opposite sides of the main support member and substantially at right angles to the main support member, slots in the main support member extending from the ends thereof towards the centre of the support member, external threads on the elongated main support member and locking nuts engaged threadably on such threads, locking arms connected pivotally at one end to the main support member to extend on opposite sides of the rod and in the same plane as the rod, openings in the locking arms in alignment with the slots in the main support member, puller bars mounted slidably through the slots in the main support member and the openings in the locking arms, the openings in the locking arms being of a size to permit movement of the puller bars through the openings and the slots in one direction when the locking arms are moved towards the main support support member and to prevent sliding movement of the puller bars in the opposite direction when the locking arms are moved away from the main support member, spring means co-acting between the main support member and the locking arms normally to urge the locking arms away from the main support member and work engaging means on the opposite ends of the puller bars.

5. The device as claimed in claim 4 wherein the puller bars are reversible in the main support member and the locking arms.

References Cited

The following references, cited by the Examiner, are of record in the patented file of this patent or the original patent.

UNITED STATES PATENTS

| | | | |
|---|---|---|---|
| 1,359,768 | 11/1920 | Thomason | 29—261 |
| 1,388,839 | 8/1921 | Allen | 29—261 |
| 1,893,353 | 1/1933 | Bergman et al. | 29—261 X |

OTHELL M. SIMPSON, Primary Examiner